(12) United States Patent
Ellis

(10) Patent No.: US 6,377,353 B1
(45) Date of Patent: Apr. 23, 2002

(54) THREE-DIMENSIONAL MEASURING SYSTEM FOR ANIMALS USING STRUCTURED LIGHT

(75) Inventor: James S. Ellis, Broomfield, CO (US)

(73) Assignee: Pheno Imaging, Inc., Broomfield, CO (US)

(*) Notice: Subject to any disclaimer, the term of this patent is extended or adjusted under 35 U.S.C. 154(b) by 0 days.

(21) Appl. No.: 09/520,024

(22) Filed: Mar. 7, 2000

(51) Int. Cl.⁷ ................................................ G01B 11/24
(52) U.S. Cl. .................... 356/603; 356/616; 356/396; 382/110; 348/135
(58) Field of Search .................... 356/601, 603, 356/608, 614, 616, 622, 627, 396, 397; 348/135, 552; 250/559.2, 559.21, 559.22

(56) References Cited

U.S. PATENT DOCUMENTS

| | | |
|---|---|---|
| 4,745,472 A | 5/1988 | Hayes |
| 4,787,739 A * | 11/1988 | Gregory |
| 5,412,420 A * | 5/1995 | Ellis .......................... 348/135 |
| 5,483,441 A * | 1/1996 | Scofield ..................... 364/400 |

OTHER PUBLICATIONS

"Linear Classification Program" brochure, published by Holstein Association, Brattleboro, Vermont in Sep. 1990.
Advertisement for a Perceptron Lasar camera, published by Perceptron, Inc., Farmington Hills, Michigan.

* cited by examiner

Primary Examiner—Hoa Q. Pham
(74) Attorney, Agent, or Firm—James R. Young

(57) ABSTRACT

A system measures the three-dimensional linear, angular and volumetric characteristics of an animal or carcass, such as a beef animal. The system uses light spots from a structured light camera to measure multiple points on the animal. The system locates the vertical, horizontal and depth dimension for each point and uses this data to calculate the desired linear and volumetric measurements for conformation of the animal by combining measurements of some of the light spots projected on the animal. The system also provides rapid consecutive three-dimensional motion pictures of the animal.

27 Claims, 8 Drawing Sheets

THREE-DIMENSIONAL MEASURING SYSTEM FOR ANIMALS USING STRUCTURED LIGHT

FIELD OF THE INVENTION

This invention relates to a system for evaluating the physical characteristics of animals and more particularly to a structured light system for three-dimensional measuring. Even more particularly, the invention relates to projecting structured light toward an animal or carcass, measuring the reflection of the light from the animal or carcass, and using the measured light to develop a three-dimensional surface scan that can be used to measure both the linear, volume and angular related characteristics of the animal and provide rapid, consecutive images of an animal in motion.

BACKGROUND OF THE INVENTION

Throughout the history of the domestic livestock industry, mankind has attempted to measure animals, whether the need was to be taller, longer, thicker, leaner, wider or stronger, taking accurate measurements quickly has always been important. In modern times it has become more and more important to measure offspring of sires and compare those groups of offspring with like kind. Obviously, the sires that provide improved offsprings are in great demand and can provide the most improvement to a breed. Much of the future genetic progress will be attributed to our ability to improve the speed and accuracy of measuring animals.

Systems have evolved from measuring horses by using the approximate width of a hand; for example, a horse could be reported as 14 hands high which was about 56 inches. Currently some animals are measured at 15 different conformation points, however, most often the measurements are only visual appraisals, with even a tape measure being seldom used. Thus, there is tremendous need for more information and the improved accuracy of that information to accelerate breed progress.

One method of compiling data is shown in U.S. Pat. No. 4,745,472 issued May 17, 1988 to Hayes, entitled "Animal Measuring System". This method uses a video camera to take a picture of the animal, and then the picture is processed by a computer system to determine the measurements. Plastic patches were placed on several points of the animal, and measurements were made of these points. Another method of compiling data is shown in U.S. Pat. No. 5,483,441 issued Jan. 9, 1996 to Scofield, entitled "System for Evaluation Through Image Acquisition" and U.S. Pat. No. 5,576,949 issued Nov. 19, 1996 to Scofield and Engelstad, also entitled "System for Evaluation Through Image Acquisition". These systems use a conventional video camera, so they can only measure in two dimensions. Thus, in addition to the camera measurement, additional hand measurements usually need to be made, or the data from several cameras must be coordinated. Coordination of the data from several cameras is a difficult task, requiring manual interpretation by a skilled operator.

An additional method for compiling animal conformation is shown in U.S. Pat. No. 5,673,647 issued Oct. 7, 1997 to Pratt, entitled "Cattle Management Method and System." This method, in part, explains the measuring of external animal dimensions. This method also measures using only two dimensions.

A three dimensional measuring system is shown in U.S. Pat. No. 5,412,420 issued May 2, 1995 to Ellis, entitled "Three-Dimensional Phenotypic Measuring System for Animals." This system uses laser light signals to provide a three-dimensional measuring of linear and volumetric conformation traits of an animal, comparing those traits to predetermined traits and providing a rating of the animal. This system requires that the animal remain still during the laser scan of the animal.

It is thus apparent that there is a need in the art for an improved system which measures physical characteristics of an animal. There is further need in the art for such a system to measure in three dimensions. Another need is for such a system that does not require that patches be affixed to the animal before measuring. A still further need is for such a system that can measure in three dimensions using a single camera to provide linear, volume and angular measurements as well as improving the speed of imaging the animal. There is a further need for such a system that can provide rapid and consecutive three-dimensional images of an animal in motion. The present invention meets these and other needs in the art.

SUMMARY OF THE INVENTION

It is an aspect of the invention to measure physical characteristics of a live animal or carcass.

It is another aspect of the invention to measure the physical characteristics using reflected structured light.

Still another aspect is to measure the physical characteristics in three dimensions from a single camera.

Yet another aspect is to take rapid consecutive three-dimensional images of a moving animal.

Accurate three-dimensional information can be collected from a single location using reflected structured light. A three dimensional image is created by projecting a structured light pattern, for example wherein each element of the pattern is a circle of light and the circles are arranged in a grid pattern, a horizontal band or a vertical band of light, onto the animal and measuring the reflection of the elements of the pattern. The structured light from the animal is measured for differing distances by comparing the dimensions of the reflected structure light pattern elements on the animals to a known constant.

The pattern of circles is used to measure a predetermined number of locations on the animal, and the distance to each of these locations, thus creating a three-dimensional image of the animal. The radius of curvature of each of the circles can also be determined by the shape of each of the reflected circles. For example, an ellipse with an elongated vertical dimension indicates that the surface at the point of the ellipse is curving either away from the light source or toward the light source, and the length of the vertical dimension is used to determine the radius of curvature. The distance from the camera to the animal for multiple spots in the same vertical line indicates the direction of the curve, that is, whether the curve is concave or convex. This same concept is also used for horizontal patterns of circles to determine the radius of curvature in the horizontal direction, as well as whether the curve is concave or convex.

Because animals are symmetric, an image need only be taken of one side of the animal. Thus a single camera at a single location provides all the three-dimensional information necessary for conformation of an animal. With some breeds, such as dairy cows, it may be necessary to use a second camera or take a second image of hidden areas; for example, a dairy cow may need a second image of the mammary system as viewed from the rear to provide additional accuracy for that portion of the animal.

A computer system selects the points of the animal desired for the conformation, measures the distance between these points to provide the conformation data, combines the selected conformation data for each animal with an identification number, and stores the conformation data and number for each animal. In addition, an image of the animal, showing the markings of the animal, may be stored along with the other conformation data.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
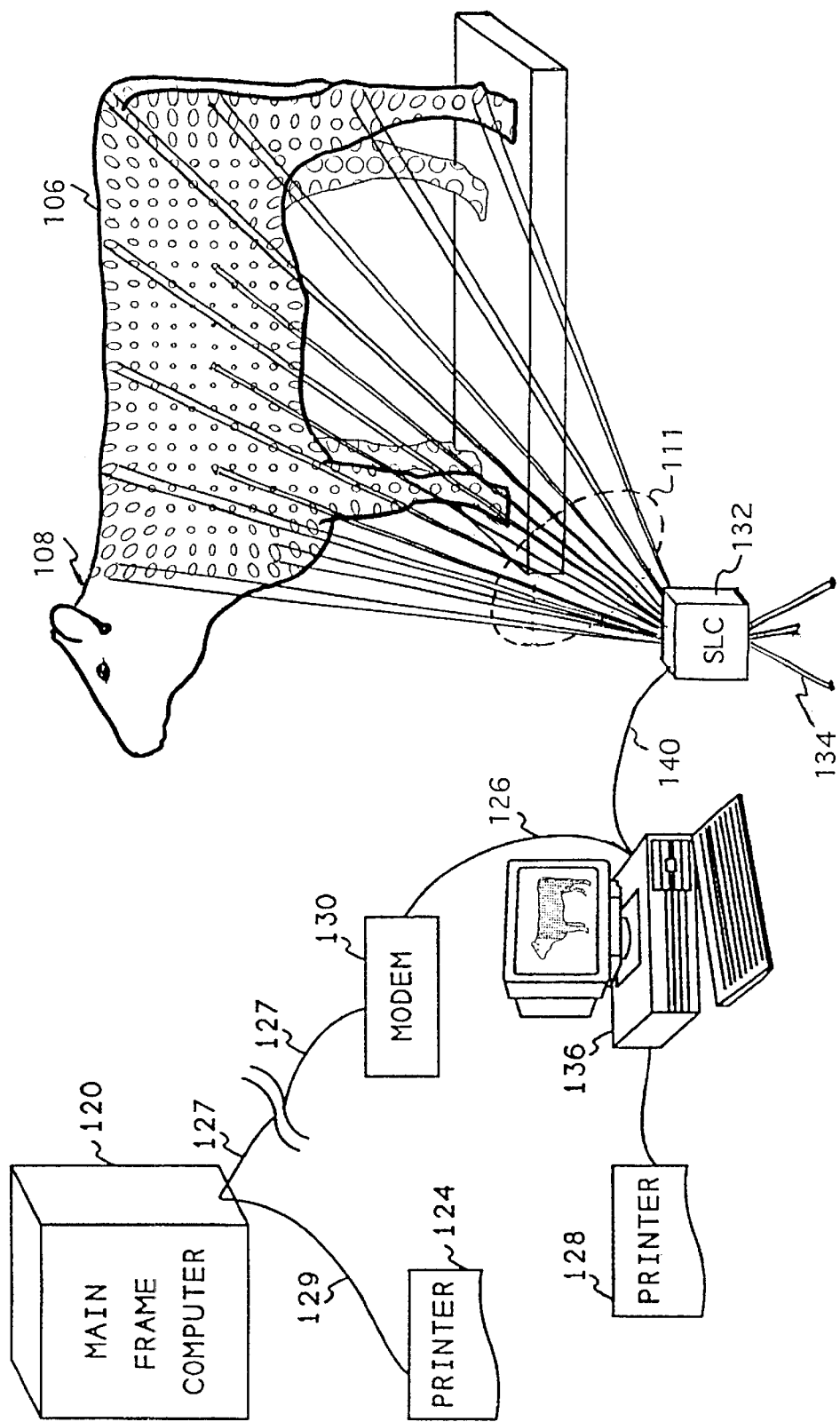
FIG. 1 shows a view of the present invention measuring and compiling data of an animal.

The following description is of the best presently contemplated mode of carrying out the present invention. This description is not to be taken in a limiting sense but is made merely to describe the general principles of the invention. The scope of the invention should be determined by referencing the appended claims.

A three-dimensional image of an animal or carcass is created by projecting a structured light display onto the animal and measuring the reflection of the display. The reflected structured light from the animal can be measured for differing distances by comparing the diameter (width) of the reflected structured light display on the animals to a known constant. The sources of light are projected through a lens or lenses that control the light to provide a very slight increase in the diameter of the numerous source spots or bands as the light moves away from the source.

For example, a single circular beam of structured light can be created by placing a hole in a planar surface, such as a thick paper or metal card, next to a light source. A lens in front of the planar surface is used to focus the circular spot created by the hole to within a 6 to 8 foot range. The lens is used to adjust the diameter of the circular spot to be 1.5 inches at 6 feet. The diameter of the spot will then be 1.75 inches at 7 feet, and the diameter will be 2.0 inches at 8 feet. The distance (z-axis) to the reflected spot can then be calculated, within this 6 foot to 8 foot range, by measuring the diameter of the reflected circular structured spot. A three-dimensional measurement is then achieved by measuring the x-axis, and y-axis locations for the structured light spot.

Using a grid pattern of circular structured light spots, the dimensions of the animal can be determined from the midsection of an animal upward towards the back bone (top) as the animal curves away from the source. As described above, a beam that lands on a vertical surface (or nearly vertical) creates a circle of reflected light. Another spot that reflects from a higher location on the animal, where the surface is curving away from the source, will reflect an ellipse, elongated in the vertical direction. As the degree of angle from vertical increases, the length of the elongated shape increases proportionally. The position of the x-axis and y-axis for the spot are still at the center of the elongated spot. However, the depth (z-axis) has moved and can be calculated by the using the shorter diameter of the two axes of the spot as the diameter of a circle. The same concept is true for elongated structured light reflections on the front, rear, or belly of the animal.

If the originating light source holes in the grid are set in rows at equal distance apart and consecutive rows are at equal distances, then the structured light display on the animal will provide a consistent pattern of spots. The resolution of the display image can be varied by the number of holes used to structure the light at the source. For example, a tall and narrow structured light display (approximately seven feet tall by three feet wide) can be used to measure a hanging beef carcass. Changing of the focus point of the spots can vary the distance to the animal of the structured light display to accommodate larger or smaller animals.

After receiving the structured light display, computerized calculations of each image are made to create a three-dimensional surface model of the animal. The head and tail can be, but are usually not included in the surface model because they are not normally measured. The head on some occasions may be obstructed from view by a stanchion or head lock apparatus in a chute.

A high speed camera or video camera can be used to receive the structured light display image from the animal. By creating a succession of images, movement characteristics of the animal can be measured. While a continuous source of structured light is typically used, a flash or consecutive flashes of structured light projected toward the animal and coordinated with the camera can also be used to create a three dimensional moving image or motion picture of the animal. By creating a series of pictures, the system can also select the best of the series of pictures for use.

FIG. 1 shows the system of the present invention that measures three-dimensional phenotypic characteristics of an animal using a structured light camera. Referring now to FIG. 1, the animal 108 shown in FIG. 1 is a beef animal, standing in front of the structured light camera 132. The beef animal 108 can be free standing, tied, in a stanchion or in a chute. The camera 132 generates a detailed map of the entire animal within the scanned space assigning range values to each surface point that receives a structured light pattern element. The tripod 134 can be used for the structured light camera 132 or the camera can be hand held or set on a table. Typically, there are 900 surface points, called pattern elements, in the field of view of the camera 132, however the number of pattern elements can be increased or decreased depending upon the structure light means used as the source. FIG. 1 does not contain sufficient detail to illustrate all surface points, so the lines 111 represent the number of structured light signals that would cover the entire animal.

An electrical source (not shown) provides electric power for the camera 132, personal computer 136 and the printer 128. In a remote environment, this electrical source can be provided by a portable generator or batteries. Connecting data cable 140 transmits the information from the camera 132 to the personal computer 136. A telephone modem 130 and wires 126 and 127 can be used to transmit data from the personal computer 136 to a main frame computer 120 and back to printer 124. A local printer 128 could also be used to print the data.

When the horizontal, vertical and distance dimensions of two points on the animal are provided by the camera 132 measurements, then the difference between those two points can easily be computed. See, for example, U.S. Pat. No. 5,412,420 issued May 2, 1995 to Ellis, entitled "Three-Dimensional Phenotypic Measuring System for Animals", incorporated herein by reference for all that is disclosed and taught therein. By measuring hundreds of points on the animal, the system calculates hundreds of different measurements. The system also calculates the volume of the barrel, loin muscle and round muscle (rear hind quarter) of the animal. One particular advantage of the structured light measurements is that the system can calculate the distance to the animal, thus avoiding inaccuracies of some prior art camera systems when the animal is placed at an incorrect distance from the camera.

Figure 2:
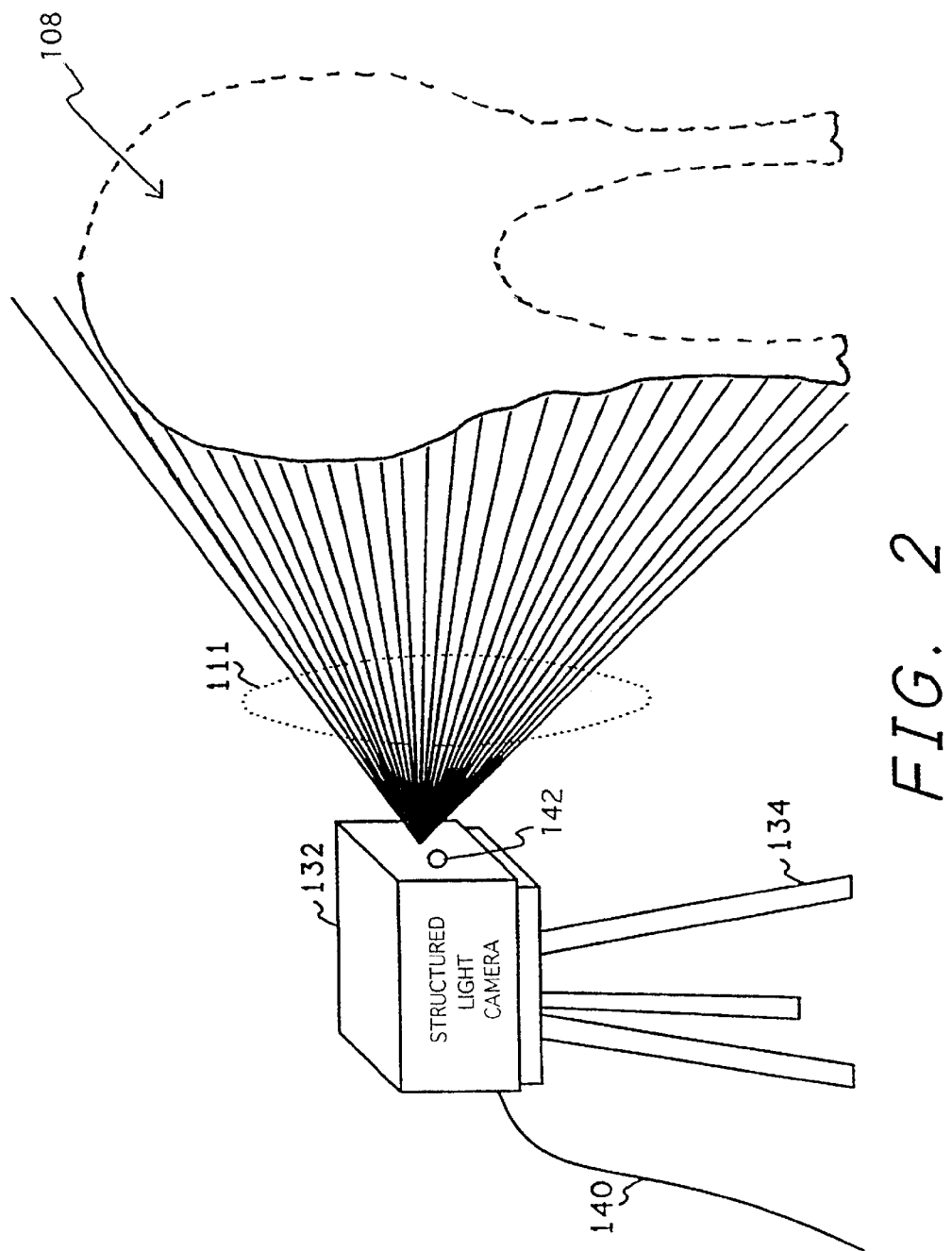
FIG. 2 shows a single linear latitude cross section (horizontal end view) of an animal to illustrate a portion of the image process of structured light signals.

FIG. 2 shows a side cross section view of the animal along with the measuring system to illustrate the three-dimensional measurements of the animal. Referring now to FIG. 2, the animal is shown with the side away from the camera 132 in dotted lines. The camera 132 scans a line of the animal from the top of the animal, i.e. 106 of FIG. 1, to the floor or ground. This example helps visualize the concept of the structured light signals 111 as they measure distance to each surface point.

Figure 3:
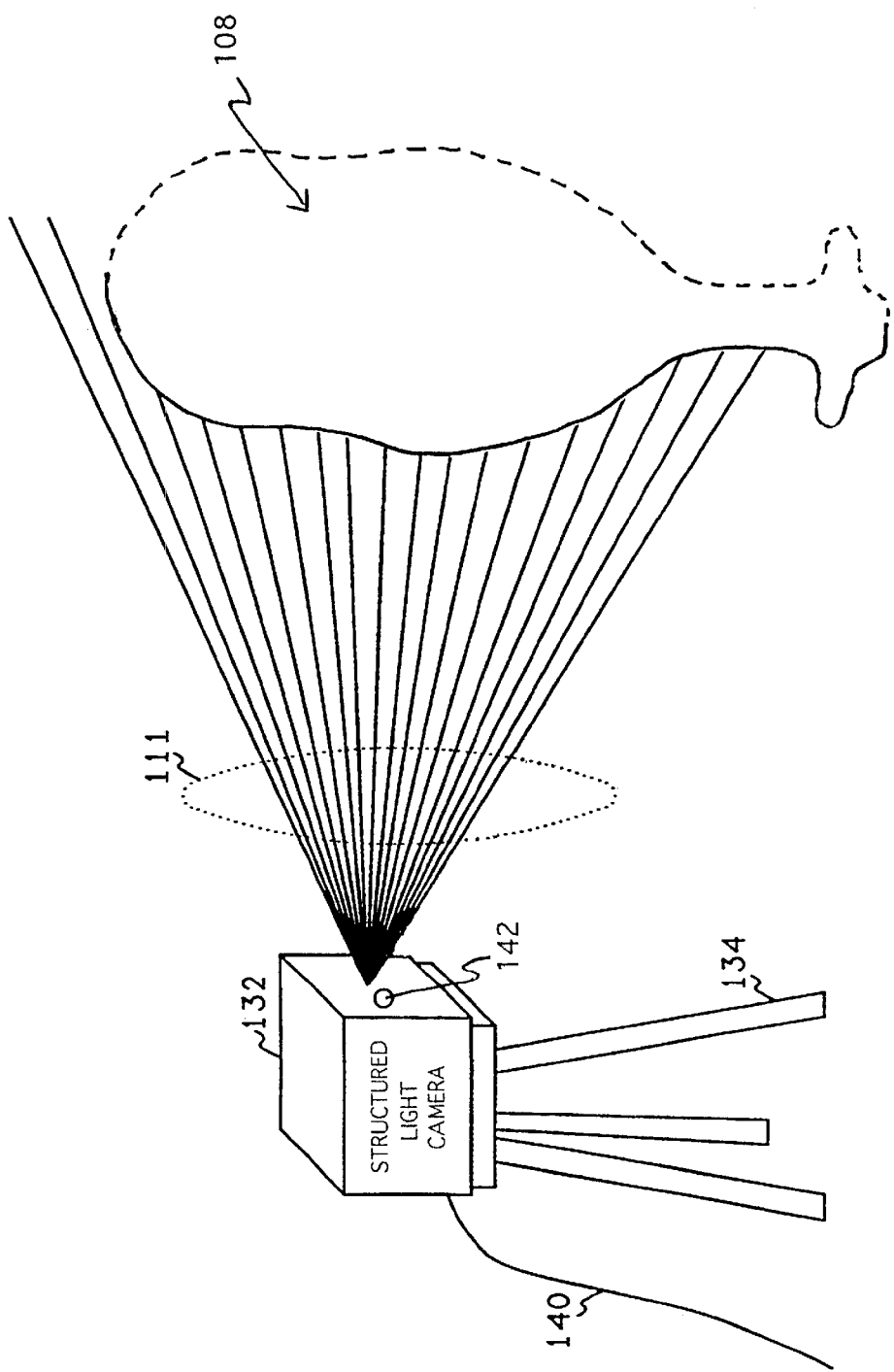
FIG. 3 shows a single linear longitude cross section (overhead view) of an animal to illustrate a portion of the image process of structured light signals.

FIG. 3 shows a top view of the animal and the structured light signals 111, wherein the side of the animal opposite the camera 132 is shown in dotted lines. Referring now to FIG. 3, the camera 132 scans a line of the animal from the front of the body of the animal to the rear of the animal 108 in FIG. 3. The opening 142 in camera 132 receives the reflected structured light. This example helps visualize the concept of the structured light signals 111 as they measure the distance to each point on the animal.

Figure 4:
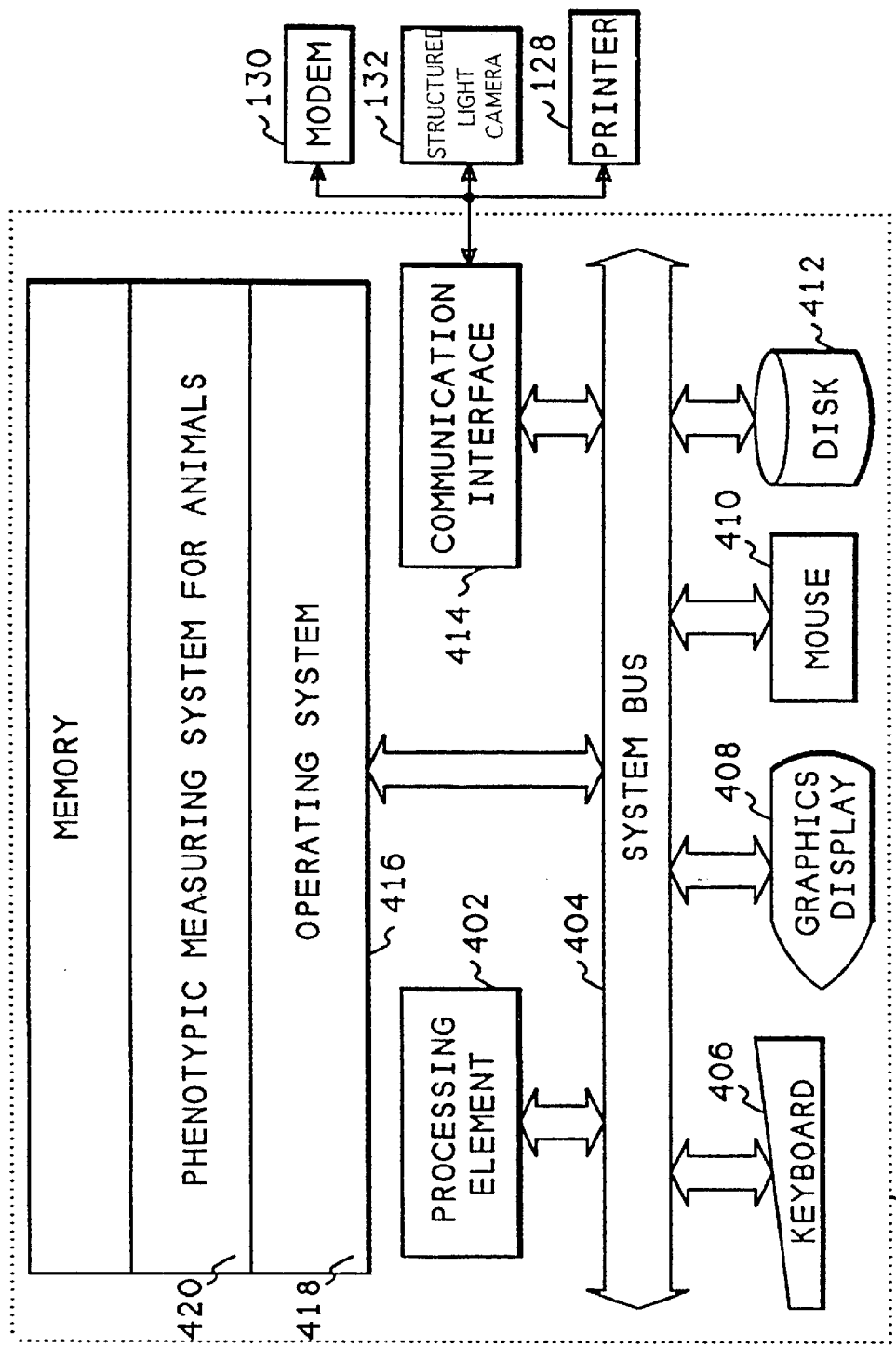
FIG. 4 shows a block diagram of the present invention.

FIG. 4 shows a block diagram of a computer system and the structured light camera of the present invention. Referring now to FIG. 4, the computer system 136 contains a processing element 402. The processing element 402 communicates to the other elements of the computer system 136 over a system bus 404. A keyboard 406 and a structured light camera 132 allow input to the computer system 136. A mouse 410 provides input for locating specific points on the image of the animal as displayed on graphics display 408, which also provides a display of any other information to be viewed by a user of the computer system 136. A printer 128 allows for output to paper to be viewed by a user of the computer system 136. A disk 412 stores the software and data used by the system of the present invention, as well as an operating system and other user data of the computer system 136.

A memory 416 contains an operating system 418, and an application program 420, a phenotypic measuring system for animals. Those skilled in the art will recognize that the operating system 418 could be one of many different operating systems, including many windows-type operating systems, and that many application programs could be performing in a multi-tasking operating system.

Figure 5:
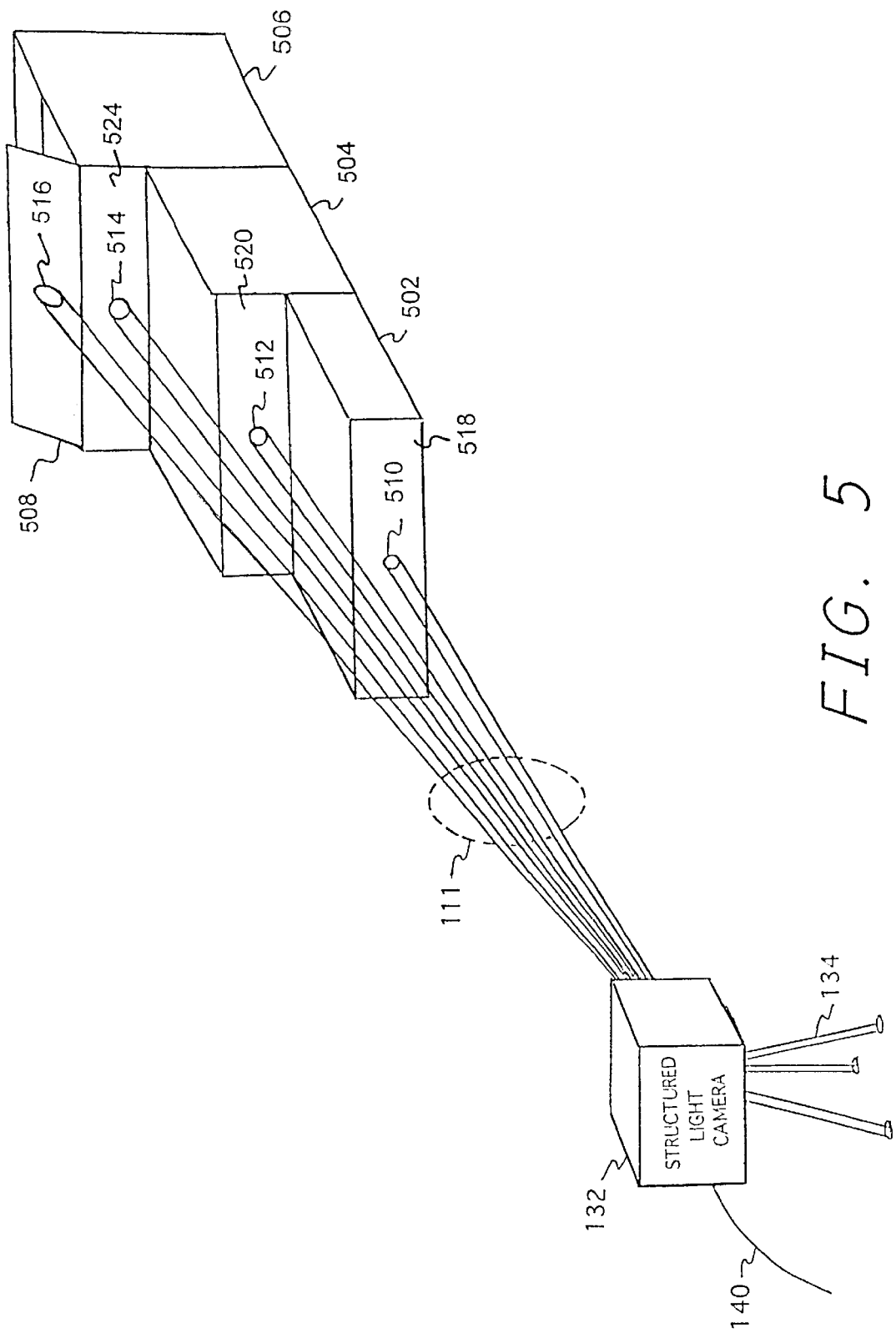
FIG. 5 shows a view of a structured light camera projecting circle patterns at varying distances.

FIG. 5 is a diagram illustrating how distance is measured using structured light. Referring to FIG. 5, a structured light camera 132 includes a projection system (shown below in FIG. 6) that projects a pattern of circular spots that are all the same size when they leave the projection system, as illustrated by light rays 111. Three boxes 502, 504, and 506 are arranged at successively greater distances from the structured light camera 132.

A spot 510 strikes box 502 and this spot has a fixed diameter. A second spot 512, which strikes box 504 further away from the camera 132, has a fixed diameter larger than the diameter of spot 510. This larger diameter spot indicates that the surface 520 on which the spot 512 is projected is further away from the camera 132 than is the surface 518 on which spot 510 is projected. Similarly, spot 514 has a still larger diameter, indicating that the surface 524 is still further away from the camera 132 than is either surface 520 or surface 518.

After calibration and measurement of the size of the spots 510, 512, and 514, the distances of the surfaces 518, 520 and 524 from the camera 132 can be determined.

Surface 508 is canted back from the vertical, and therefore spot 516 forms an ellipse on the surface 508. The center of the ellipse is the same as the center of a circular spot would be if the surface 508 were vertical. The diameter of the horizontal dimension of the ellipse can be used to measure the distance to the center of the ellipse, and the length of the vertical dimension of the spot 516 can be used to determine the angle at which the surface 508 is canted from vertical. The horizontal dimension of spot 516 will be the same as the horizontal dimension of a circular spot located at the same distance from the camera 132 if the surface 508 is perpendicular to the beam 111. If the horizontal dimension of the spot 516 is elongated, than the surface 508 is not perpendicular to the beam 111. Thus, the shape of the spots 510, 512, 514, and 516 is used to indicate both the distance from the camera 132 and the angle of the surface on which the spots are projected.

Figure 6:
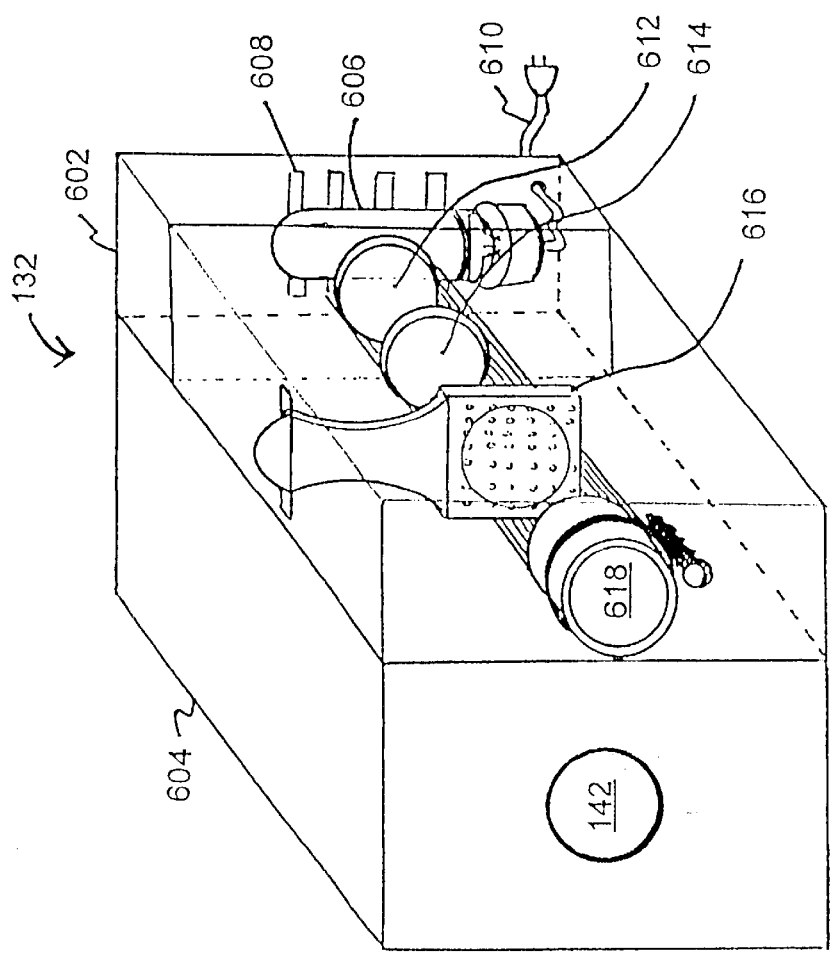
FIG. 6 shows a block diagram of a structured light camera.

FIG. 6 shows a block diagram of a structured light camera, as used in the present invention. Referring to FIG. 6, a structured light camera 132 is shown having a projection system 602 and a light receiving system 604. The light receiving system 604 is typically a conventional video camera (not shown), but could be any other type of camera, having a lens opposite an aperture 142. The aperture 142 merely serves to limit the field of view of the video camera and may not be necessary with some cameras.

The projection system 602 is similar to a conventional slide projector and it projects the structured light pattern. A lamp 606, connected to a suitable electrical source 610, provides illumination. Vents 608 cool the lamp 606 and lenses 612 and 614 condense the light from lamp 606 and provide a heat shield to prevent heat from the lamp 606 from altering the shape of the structured light pattern slide 616. The pattern slide 616, which is interchangeable, is used to create the pattern of circles, horizontal stripes or vertical stripes, etc. After the light from lamp 606 passes through the pattern slide 616, it is focused by lens 618 to the approximate distance of the animal.

Figure 7:
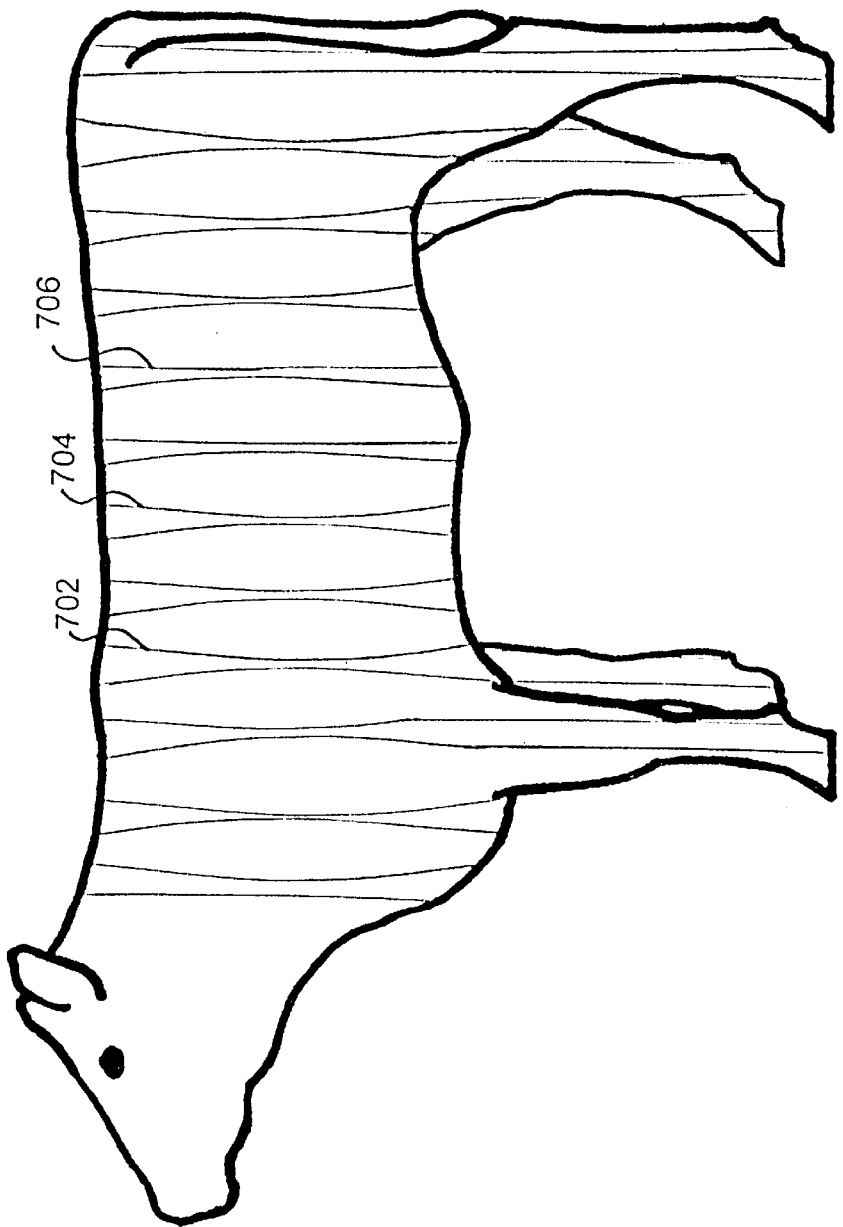
FIG. 7 shows an animal with a vertical stripe pattern projected thereon.

FIG. 7 shows an animal with a plurality of vertical stripe pattern elements being projected thereon, for example elements 702, 704 and 706. Using vertical stripe pattern elements allows continuous distance data to be determined along the vertical axis. A similar pattern of horizontal pattern elements can also be projected upon the animal.

Continuous distance data can be acquired in both vertical and horizontal directions by using both these patterns in two separate images. This is done by projecting a vertical pattern, capturing an image of the vertical pattern, then projecting a horizontal pattern and capturing an image of the horizontal pattern. Both these images are then processed to produce continuous vertical and horizontal distance data. By creating both the images in rapid succession, any error caused by movement of the animal is reduced.

Figure 8:
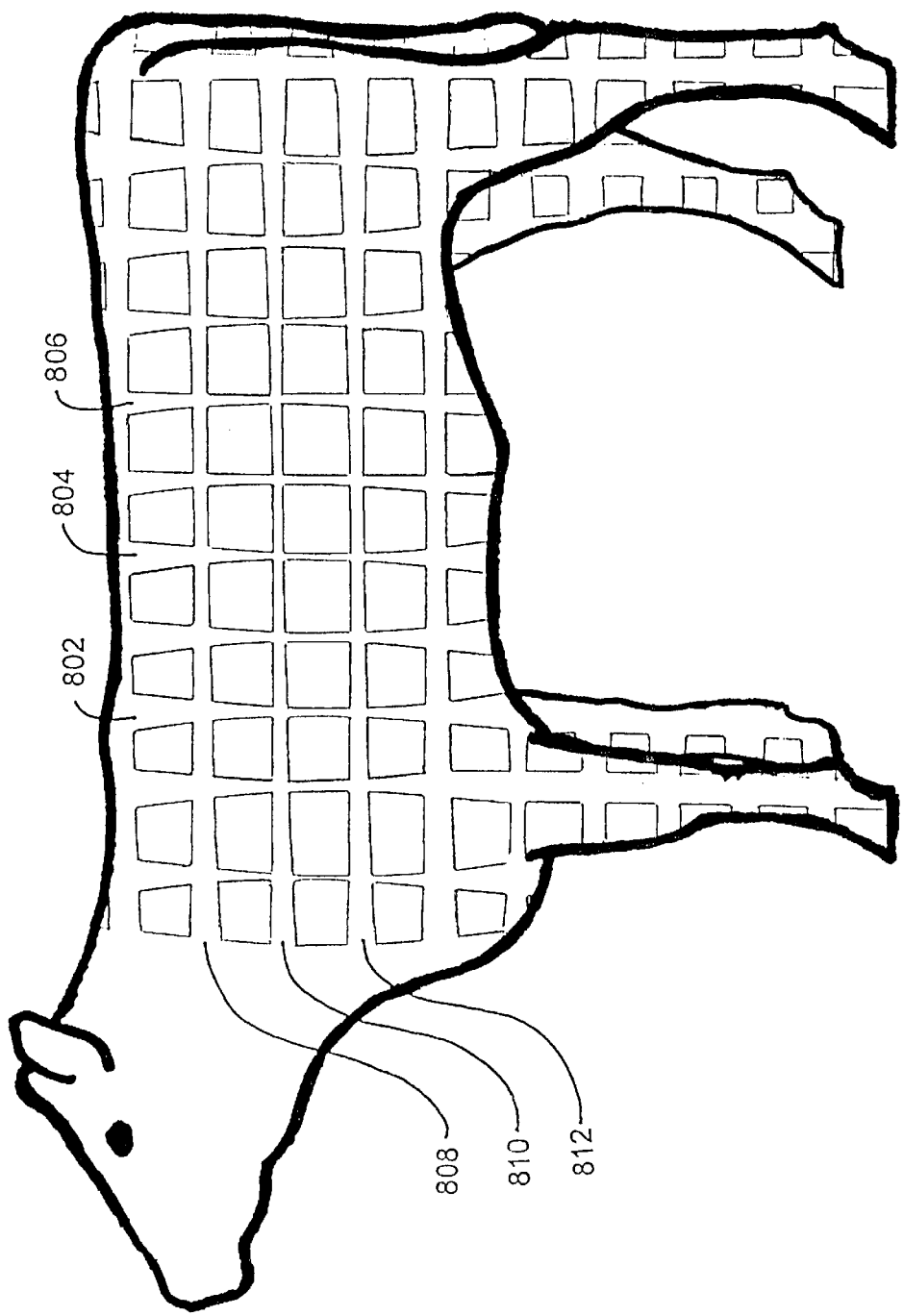
FIG. 8 shows an animal with a grid pattern of vertical and horizontal striped pattern elements projected thereon.

FIG. 8 shows an animal with a combination of vertical pattern elements, for example elements 802, 804, and 806, and horizontal pattern elements, for example elements 808, 810, and 812, projected thereon. This type of pattern provides nearly continuous horizontal and vertical distance data while allowing both vertical and horizontal patterns in a single image.

While the general inventive concepts and systems have been described in connection with illustrative and presently preferred embodiments thereof, it is intended that other embodiments of these general concepts and systems be included within the scope of the claims of this application and any patent issued therefrom. It is contemplated that use of the present system will enable an enhanced knowledge with respect to the correlation between measurable characteristics and traits of carcasses or animals and their offspring. While the general concepts and systems of the invention have been illustrated and described by reference to a particular kind of animal, i.e., beef animal, it is to be understood and it is contemplated that the general concepts may be applied to other kinds of animals or animal carcasses, such as dogs, pigs, dairy cattle, horses, chickens, etc. and human beings for any worthwhile purpose.

What is claimed is:

1. A system for measuring linear and volumetric characteristics of an animal, the system comprising:
    image projection means for projecting a plurality of structured light elements toward the animal to reflect therefrom;
    image receiving means for receiving the reflected structured light elements and providing vertical and horizontal dimension data for each of the reflected structured light elements; and
    computer means for receiving the vertical and horizontal dimension data, for determining distance data comprising a distance between each of said structured light elements and a distance between the image receiving means and each of said structured light elements, and for measuring linear and volumetric characteristics of the animal using said distance data.

2. The system of claim 1 further comprising:
    means connected to the computer means for capturing an image of the animal wherein the image contains identifying markings of the animal.

3. The system of claim 1 wherein said computer means further comprises means for computing, from the distance data, a volume of at least one portion of the animal.

4. The system of claim 1 wherein said computer means further comprises means for determining a rating of the animal.

5. The system of claim 1 wherein said computer means further comprises means for determining a radius of curvature of at least one area of the animal.

6. The system of claim 1 wherein said structured light elements comprise circular spots of light.

7. The system of claim 1 wherein said structured light elements comprise linear bands of light.

8. The system of claim 1 wherein said structure light elements comprise vertical linear bands of light projected at a first time and horizontal linear bands of light projected at a second time.

9. The system of claim 1 further comprising means for receiving at least two images of the animal, and further wherein said computer means determines at least one movement characteristic of the animal from said at least two images.

10. A method for measuring linear and volumetric characteristics of an animal, the method comprising the steps of:
    (a) projecting a plurality of structured light pattern elements toward the animal to reflect therefrom;
    (b) receiving structured light pattern elements reflected from the animal;
    (c) measuring vertical and horizontal dimension data for each of the reflected structured light pattern elements received in step (b);
    (d) measuring a distance between each of said structured light pattern elements received in step (b);
    (e) measuring a distance between the image receiving means and each of said structured light pattern elements received in step (b); and
    (f) measuring linear and volumetric characteristics of the animal from results of said measuring in steps (c), (d), and (e).

11. The method of claim 10 further comprising:
    (g) capturing an image of the animal wherein the image shows identifying marks of the animal.

12. The method of claim 10 wherein step (f) further comprises the step of computing, from the data of steps (c), (d), and (e), a volume of at least one portion of the animal.

13. The method of claim 10 further comprising the step of determining a rating of the animal.

14. The method of claim 10 further comprising the step of for determining a radius of curvature of at least one area of the animal.

15. The method of claim 10 wherein step (a) further comprises projecting circular spots of light as said structured light pattern elements.

16. The method of claim 10 wherein step (a) further comprises projecting linear bands of light as said structured light pattern elements.

17. The method of claim 10 wherein step (a) further comprises projecting horizontal linear bands of light as said structured light patterns and step (f) further comprises the following step (f0) performed before step (f):
    (f0) repeating steps (a) through (e) while projecting vertical linear bands of light as said structured light pattern elements in step (a) and wherein said linear and volumetric characteristics are measured from the results of said horizontal linear bands and said vertical linear bands.

18. The method of claim 10 further comprising the steps of:
    (g) repeating steps (a) through (f) to measure a second image of the animal; and
    (h) measuring at least one movement characteristic of the animal from said measurements of said two images.

19. A system for measuring linear and volumetric characteristics of an animal, the system comprising:
    a projector for projecting a plurality of structured light elements toward the animal to reflect therefrom;
    a camera for receiving receive the reflected structured light elements and providing vertical and horizontal dimension data for each of the reflected structured light elements; and
    a computer for receiving the vertical and horizontal dimension data, for determining distance data comprising a distance between each of said structured light elements and a distance between the image receiving means and each of said structured light pattern elements, and for measuring linear and volumetric characteristics of the animal using said distance data.

20. The system of claim 19 further comprising:

a capturing system connected to the computer means for capturing an image of the animal wherein the image contains identifying markings of the animal.

21. The system of claim 19 wherein said computer further determines a volume of at least one portion of the animal.

22. The system of claim 19 wherein said computer further determines a rating of the animal.

23. The system of claim 19 wherein said computer further determines a radius of curvature of at least one area of the animal.

24. The system of claim 19 wherein said structured light elements comprise circular spots of light.

25. The system of claim 19 wherein said structured light elements comprise linear bands of light.

26. The system of claim 19 wherein said structure light elements comprise vertical linear bands of light projected at a first time and horizontal linear bands of light projected at a second time.

27. The system of claim 19 wherein said camera receives at least two images of the animal, and further wherein said computer system determine s at least one movement characteristic of the animal from said at least two images.

* * * * *